(No Model.)

H. F. SAWTELLE.
DOOR ROLLER.

No. 353,507.  Patented Nov. 30, 1886.

Witnesses.
George B. McNeal.
Chas. E. Knapp.

Inventor.
Henry F. Sawtelle.

UNITED STATES PATENT OFFICE.

HENRY F. SAWTELLE, OF LEOMINSTER, MASSACHUSETTS.

DOOR-ROLLER.

SPECIFICATION forming part of Letters Patent No. 353,507, dated November 30, 1886.

Application filed February 6, 1886. Serial No. 190,991. (No model.)

*To all whom it may concern:*

Be it known that I, HENRY F. SAWTELLE, a citizen of the United States, residing at Leominster, in the county of Worcester and State of Massachusetts, have invented certain new and useful Improvements in Door-Rollers, of which the following, taken in connection with the accompanying drawings, is a specification.

This invention relates to certain improvements in anti-friction rollers or trucks for sliding or folding doors.

Figure 1:
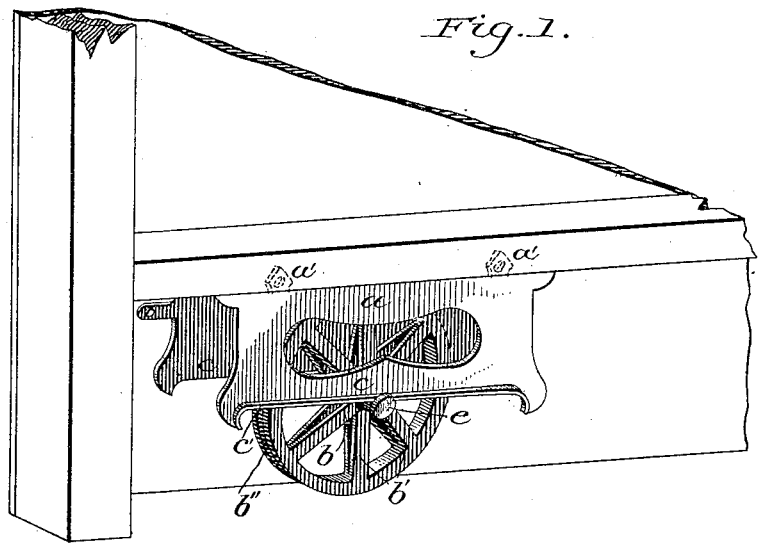
Figure 2:
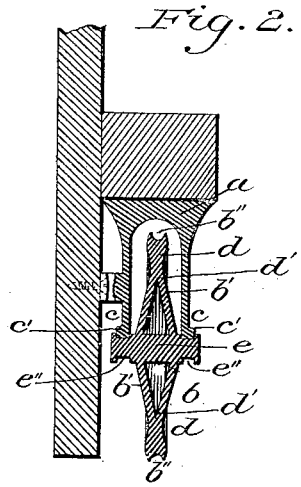
Figure 3:
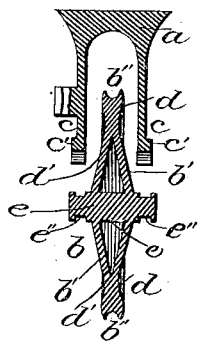

Figure 1 represents a perspective view of the invention attached to a broken section of the door. Fig. 2 represents a sectional view of the roller and a sectional view of a portion of the door to which it is attached; and Fig. 3, a sectional view of the invention, with the frame of the roller elevated above the axle of the wheel to give more clearly a correct idea of the relative construction of each.

Similar letters of reference refer to similar parts wherever they occur on the different parts of the drawings.

The frame $a$ is made with a flat top to fit under the bottom frame-piece of the door, and may be provided with upward-projecting lips, to be bolted or screwed to said frame-piece, as indicated by the dotted lines at $a'$ $a'$. The lower edges of the riding-rails $c$ $c$ are re-enforced at $c'$ $c'$ to prevent their wearing the axle, as a plain thin one would do after some service, provided the doors were heavy. Another advantage is that the central and upper portion of said riding-rails may be made very thin, and thus require less metal in their construction, and yet involve more strength, also more surface edge will rest on the axle, and cause it to move more steadily.

The wheel $b$ is constructed as follows: The spokes $b'$ are solid at the rim of the wheel, indicated by $d$, but at or about the point represented by $d'$ they separate, one half extending to the right in an oblique direction until it reaches the axle $e$, and the other half extending to the left in the same degree until it reaches the axle; consequently at the axle the split spokes are some distance apart, and the center of the groove $b''$ in the rim of the wheel is directly over the center of the axle. By this construction the wheel is much stronger, as it is securely braced, and is less liable to break from any strain that might come upon the door than if the spokes were solid and extended at right angles from the axle.

The riding-rails $c$ $c$ rest in grooves $e''$ $e''$ formed in axle $e$, and as the periphery of the wheel traverses the track that is placed directly under it the parts of the axle indicated by $e''$ $e''$ traverse a circumferential proportional distance of the riding-rails $c$ $c$. The annular grooves $e''$ $e''$ prevent the riding-rails from spreading apart or in any way becoming misplaced, and they also steady the movements of the wheel $b$, and hold it rigidly in position.

Were it not for the annular grooves any forcible strain or shock applied to the side of the door would cause the riding-rails to spread and slide longitudinally on a smooth axle, and thus bend or break them, and render the roller entirely unfit for service.

Having thus fully described the nature, operation, and general construction of my invention, I wish to secure by Letters Patent and claim—

An improved door-roller, comprising the axle $e$, having the annular grooves $e''$, and the diverging spokes $b'$, connecting said axle with the periphery of the roller, in combination with the frame $a$, having a flattened top whereby it is secured directly under the lower frame of the door, and riding-rails $c$, having re-enforcements $c'$ $c'$ on their lower edges and engaging the grooves in the axles, substantially as and for the purpose set forth.

In testimony whereof I have signed my name to this specification, in the presence of two subscribing witnesses, on this 3d day of February, A. D. 1886.

HENRY F. SAWTELLE.

Witnesses:
 CHAS. E. KNAPP,
 GEORGE B. McNEAL.